United States Patent
Hoffmann et al.

(10) Patent No.: US 9,403,275 B2
(45) Date of Patent: Aug. 2, 2016

(54) DYNAMIC OBSTACLE AVOIDANCE IN A ROBOTIC SYSTEM

(71) Applicant: GM GLOBAL TECHNOLOGY OPERATIONS LLC, Detroit, MI (US)

(72) Inventors: Heiko Hoffmann, Simi Valley, CA (US); Derek Mitchell, Calabasas, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 18 days.

(21) Appl. No.: 14/517,245

(22) Filed: Oct. 17, 2014

(65) Prior Publication Data

US 2016/0107313 A1    Apr. 21, 2016

(51) Int. Cl.
  B25J 9/16    (2006.01)

(52) U.S. Cl.
  CPC .............. *B25J 9/1666* (2013.01); *B25J 9/1697* (2013.01); *G05B 2219/40475* (2013.01); *G05B 2219/40476* (2013.01); *G05B 2219/40519* (2013.01)

(58) Field of Classification Search
  CPC .................. B25J 9/1666; B25J 9/1697; G05B 2219/40475; G05B 2219/40476; G05B 2219/40519
  See application file for complete search history.

(56) References Cited

U.S. PATENT DOCUMENTS

| | | | |
|---|---|---|---|
| 6,054,997 A | 4/2000 | Mirtich | |
| 8,160,744 B2 | 4/2012 | Nagasaka et al. | |
| 2003/0225479 A1* | 12/2003 | Waled | B25J 9/161 700/245 |
| 2004/0073414 A1* | 4/2004 | Bienenstock | G06F 3/015 703/2 |
| 2005/0126833 A1* | 6/2005 | Takenaka | B25J 13/088 180/8.1 |
| 2009/0105878 A1* | 4/2009 | Nagasaka | B25J 13/084 700/245 |
| 2009/0259337 A1* | 10/2009 | Harrold | B25J 9/1692 700/245 |
| 2010/0168950 A1* | 7/2010 | Nagano | B25J 9/1666 701/25 |
| 2012/0180983 A1* | 7/2012 | Ishikawa | G03B 27/32 165/61 |
| 2012/0320361 A1* | 12/2012 | Ishikawa | G03B 27/32 355/72 |
| 2013/0138244 A1* | 5/2013 | Nagasaka | B25J 9/1612 700/245 |
| 2013/0158840 A1* | 6/2013 | Lu | F02D 41/2432 701/104 |

(Continued)

FOREIGN PATENT DOCUMENTS

| | | |
|---|---|---|
| DE | 102009006256 A1 | 7/2010 |
| EP | 1901150 A1 | 3/2008 |
| EP | 1901151 A1 | 3/2008 |

OTHER PUBLICATIONS

S. Mohammmad Khansari-Zadeh and Aude Billard; "Realtime Avoidance of Fast Moving Objects: A Dynamical System-Based Approach"; Ecole Polytechnique Federale de Lausanne, LASA Laboratory.

(Continued)

*Primary Examiner* — Rodney Butler
(74) *Attorney, Agent, or Firm* — Quinn Law Group, PLLC

(57) ABSTRACT

A robotic system includes an end-effector, an input device, and a controller. The input device is operable for collecting data defining a position and a velocity of a dynamic obstacle in an environment of the end-effector. The dynamic obstacle has an arbitrary shape. The controller is in communication with the end-effector and is programmed to execute a method and thereby receive a set of inputs via the input device, including the position and velocity of the dynamic obstacle. The controller computes a contour function defining the closest allowed distance and direction between the end-effector and the dynamic obstacle using the Gilbert-Johnson-Keerthi algorithm, and controls the end-effector via an output command to thereby avoid contact between the end-effector and the dynamic obstacle.

8 Claims, 3 Drawing Sheets

(56) References Cited

U.S. PATENT DOCUMENTS

| | | | | |
|---|---|---|---|---|
| 2013/0226344 A1* | 8/2013 | Wong | G05D 1/024 | 700/258 |
| 2013/0331644 A1* | 12/2013 | Pandya | A61B 19/2203 | 600/102 |
| 2013/0345875 A1* | 12/2013 | Brooks | B25J 9/0087 | 700/259 |
| 2015/0010202 A1* | 1/2015 | Tuzel | G06T 7/0046 | 382/103 |
| 2015/0066199 A1* | 3/2015 | Shimono | B65G 59/04 | 700/218 |

OTHER PUBLICATIONS

S.M. Khansari-Zadeh and Aude Billard; "A Dynamical System Approach to Realtime Obstacle Avoidance"; Ecole Polytechnique Federale de Lausanne, LASA Laboratory.

Patrick Lindemann: "The Gilbert-Johnson-Keerthi Distance Algorithm"; Media Informatics Proseminar on "Algorithms in Media Informatics", 2009.

Heiko Hoffmann, Peter Pastor, Dae-Hyung Park, Stefanschaal; "Biologically-inspired dynamical systems for movement generation: automatic real-time goal adaptation and obstacle avoidance".

* cited by examiner

DYNAMIC OBSTACLE AVOIDANCE IN A ROBOTIC SYSTEM

TECHNICAL FIELD

The present disclosure relates to dynamic obstacle avoidance in a robotic system.

BACKGROUND

Robots typically include a series of linkages that are interconnected via motor-driven robotic joints. Each robotic joint represents one or more independent control variables or degrees of freedom. End-effectors such as robotic hands, grippers, and the like are the particular end linkages which act on an object in the performance of a commanded work task, for instance the grasping and moving of an object. Complex programming and motion control logic is used in a variety of ways to achieve the required levels of robotic mobility, dexterity, and work task-related functionality. End-effectors typically approach and depart from a specified goal position according to a defined path or trajectory. Such paths are pre-planned using a variety of techniques. However, conventional end-effector path planning techniques may be less than optimally robust when encountering dynamic obstacles in the work environment.

SUMMARY

A robotic controller is described herein that is suitable for controlling an end-effector in the presence of dynamic obstacles. Unlike existing approaches, the controller uses the Gilbert-Johnson-Keerthi (GJK) algorithm to compute a contour function and thereby allow the controller to deal with dynamic obstacles having an arbitrary shape, i.e., not predefined. The present methodology also uses harmonic potentials to modulate a motion plan for the end-effector, thereby steering the end-effector around such dynamic obstacles in the robot's work environment.

Specifically, the controller considers the velocity of the dynamic obstacle as an input and computes a distance between arbitrary geometric shapes representing the obstacles. This approach utilizes the GJK algorithm to compute the distance. Thus, a contour function is defined by the controller for avoiding encountered dynamic obstacles, as opposed to using predefined contour functions and defined/non-arbitrary obstacle shapes. This approach also allows the controller to use the capabilities of point cloud shapes, and for a given control point to be represented as a volume with a defined shape. In this manner, the concept of harmonic potentials is extended to situations in which the dynamic obstacles are presented as a collection of points, for instance from a 3D point cloud camera that outputs point clouds or Light Detection and Ranging (LIDAR) scans of the obstacles. Additionally, the present design contemplates automatic adjustment of a modulation function so that obstacle velocities are considered, thereby allowing the controller to better avoid the dynamic obstacles.

The above and other features and advantages of the present disclosure are readily apparent from the following detailed description when taken in connection with the accompanying drawings.

DETAILED DESCRIPTION

Figure 1:
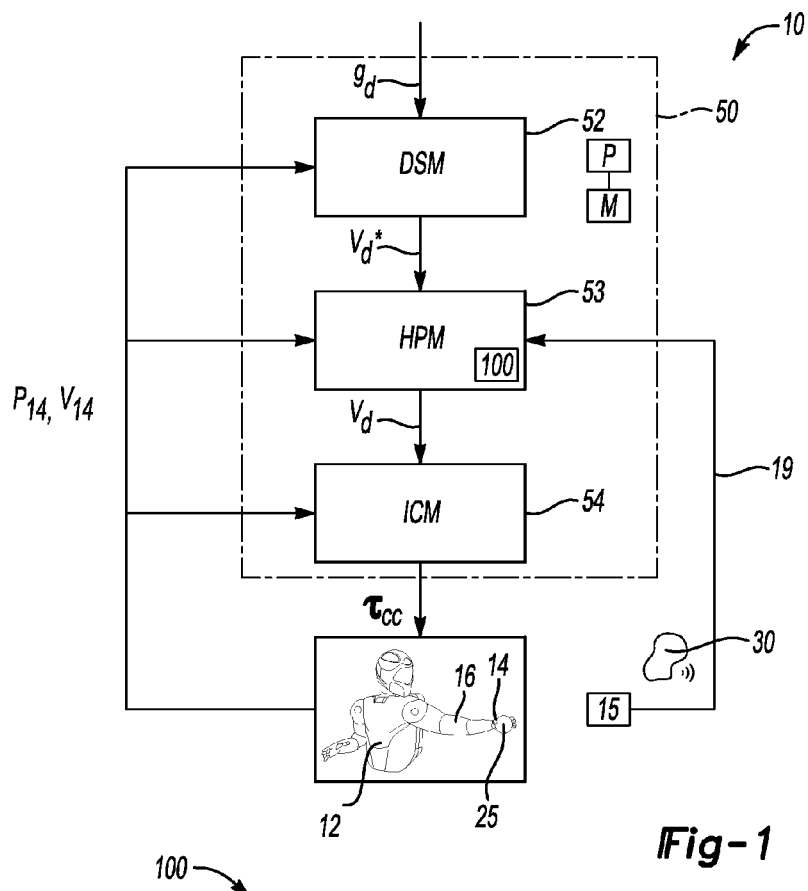
FIG. 1 is a schematic illustration of an example robotic system having a robot and a controller that combines a dynamical system utilizing flow fields with harmonic potentials for the purpose of avoiding arbitrarily-shaped dynamic obstacles.

With reference to the drawings, wherein like reference numbers refer to the same or similar components throughout the several views, a robotic system 10 is shown schematically in FIG. 1 having a controller 50. The robotic system 10 includes a robot 12. The robot 12 is depicted as an example dexterous humanoid robot in FIG. 1, but the robot 12 may be alternatively embodied as any multi-axis robot. The robot 12 operates in the presence of dynamic obstacles 30, e.g., moving operators, other robots, and the like. The controller 50 is programmed to avoid the dynamic obstacles 30 via execution of a method 100, with an example embodiment of the method 100 shown in FIG. 2. Example dynamic obstacles 30 and associated flow fields are shown schematically in FIGS. 3A and 3B.

The robot 12 includes an end-effector 14 such as a gripper or a multi-fingered hand disposed at a distal end of a robot arm 16. Motion of the robot 12, particularly of the end-effector 14 and the robot arm 16, is automatically controlled via a robotic controller 50 having a dynamical system module (DSM) 52, a harmonic potential modulator (HPM) 53, and an impedance control module (ICM) 54, the specific programmed functions of which are described in detail below. A camera 15 such as a 3D point cloud camera, a LIDAR sensor array, or the like collects a set of 3D point cloud information describing the location and approximate geometry of the dynamic obstacles 30 and relays this information to the controller 50 as point cloud data (arrow 19) as part of the method 100.

The robot 12 is programmed in software and equipped in hardware to perform one or more automated tasks with multiple control degrees of freedom, such as grasping and moving an object 25 with a changing position and velocity, and to perform other interactive tasks or control other integrated system components, for instance clamping, relays, task lighting, and the like. In the embodiment shown in FIG. 1, the robot 12 includes a plurality of independently and interdependently-moveable robotic joints to control motion of the robot arm 16 and the end-effector 14. Although omitted from FIG. 1 for illustrative simplicity, each robotic joint contains and/or is driven by one or more joint actuators, such as a joint motor, linear actuator, rotary actuator, or the like.

The controller 50 of FIG. 1 provides precise motion control of the robot 12, including control over the fine and gross movements needed for manipulating an object (not shown) that may be acted on by the end-effector 14. Additionally, the controller 50 provides online movement generation and motor control for the robot 12. The DSM 52 can be programmed to provide a dynamic movement primitive (DMP) as known in the art, thus generating a motion trajectory in real time using differential equations.

In particular, the controller 50 is intended to improve upon existing approaches toward avoidance of obstacles, e.g., the example moving/dynamic obstacles 30 shown in FIG. 1. Specifically, the controller 50 utilizes the HPM 53 to modulate motion of the end-effector 14 and thereby steer the end-effector 14 around the dynamic obstacles 30, such as is shown schematically via the streamlines 134 of FIG. 3B. Harmonic potentials as applied in the art of robotic control are valued for having capabilities similar to potential field avoidance, but without requiring the treatment of local minima. For example, some conventional approaches define continuous contour functions for each static obstacle in order to modulate control point velocities in the vicinity of such an obstacle.

Figure 3A:
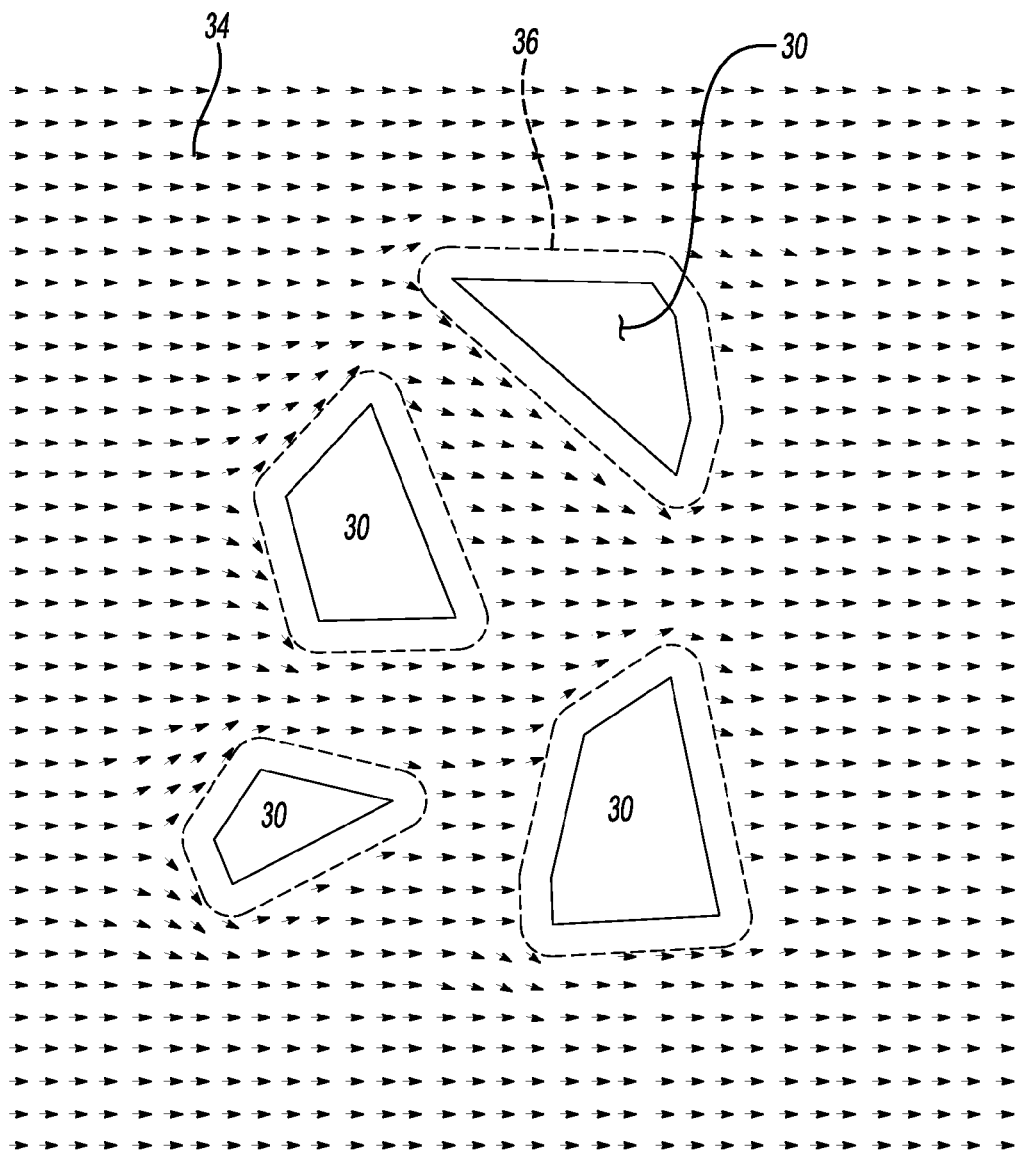
FIG. 3A is a schematic vector field.
Figure 3B:
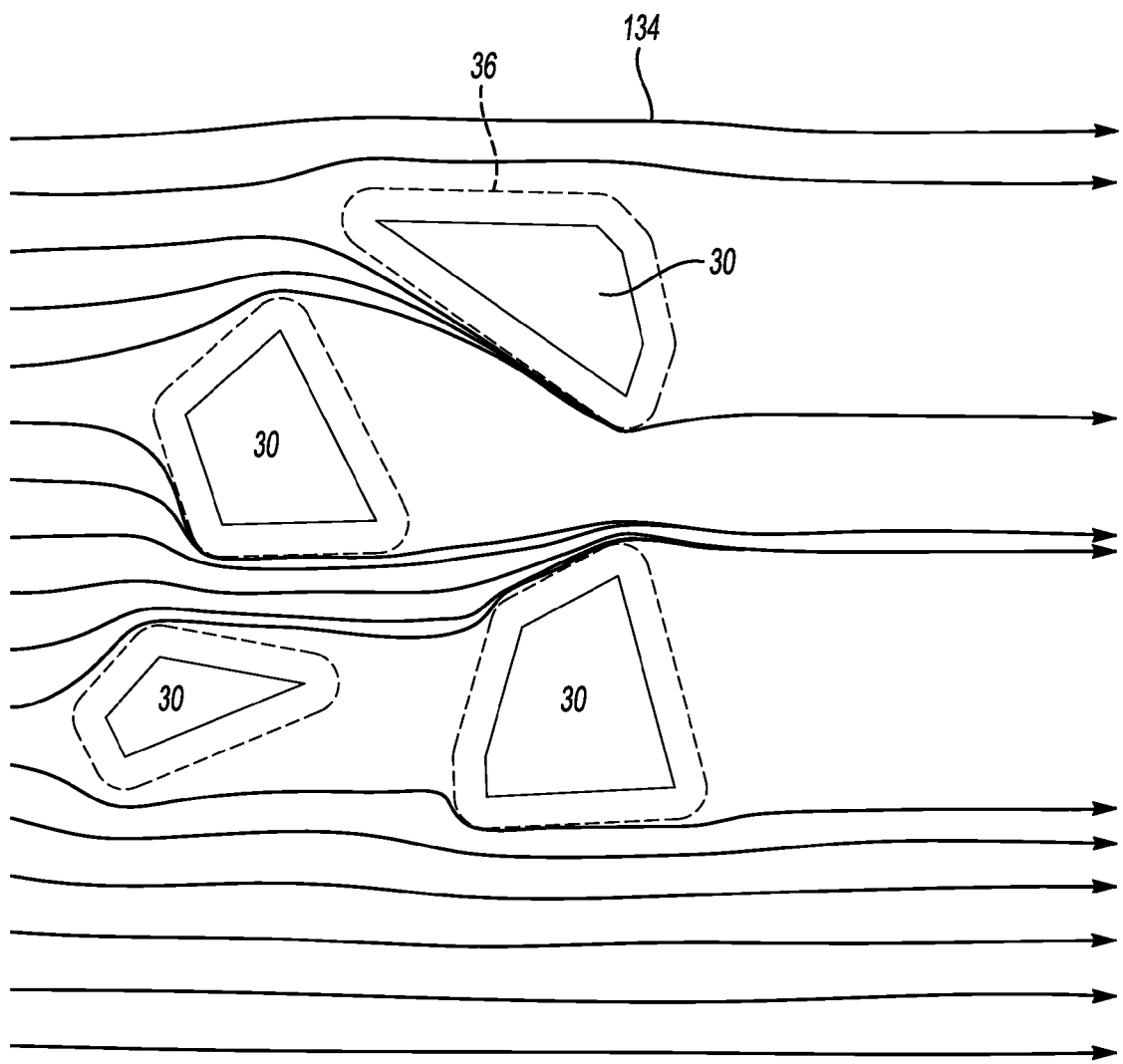
FIG. 3B is a schematic streamlined variant of the vector field shown in FIG. 3A.

The controller 50 of FIG. 1 as configured herein utilizes the Gilbert-Johnson-Keerthi (GJK) algorithm to define a contour function, as opposed to prior art approaches which deal with obstacles of defined shape via predefined contour functions. The GJK algorithm is ultimately used by the controller 50 to shape a flow field for control of the end-effector 14 as explained below. This function provides the capability of using point cloud shapes from the camera 15 as well as allowing any particular control point to be represented as a volume with a defined shape. In this way, harmonic potential methods can be readily extended to handle situations in which the dynamic obstacles 30 of FIGS. 1, 3A, and 3B are presented as a collection of points collected by the camera 15.

Additionally, the controller 50 of FIG. 1 is programmed to adjust a modulation function via the HPM 53 in such a way as to consider the velocities of the dynamic obstacles 30 in proximity to the robot 12. This approach allows the controller 50 to better avoid the dynamic obstacles 30, even if the obstacles 30 are moving at a significant speed and the control volume has no inherent velocity.

The controller 50 may be structurally embodied as a computer device or multiple such devices programmed to plan and generate robotic movements of the robot arm 16 and the end-effector 14. The control system 50 may include one or more processors (P) and memory (M), including sufficient amounts of tangible, non-transitory memory. Memory types may include optical or magnetic read only memory (ROM), random access memory (RAM), erasable electrically-programmable read only memory (EEPROM), and the like. The control system 50 may also include a high-speed clock, analog-to-digital (A/D) circuitry, digital-to-analog (D/A) circuitry, and any required input/output (I/O) circuitry and devices, as well as signal conditioning and buffer electronics. Individual control algorithms resident in the controller 50 or readily accessible thereby, such as instructions embodying the method 100 of FIG. 2, may be stored in memory (M) and automatically executed via the processor (P) at one or more different control levels to provide the respective control functionality.

A dynamic movement primitive (DMP), as is well known in the art of robotic control, can be used to generate a particular robotic movement trajectory x(t) with a given velocity v(t). The equations of motion for a DMP are motivated by the dynamics of a damped spring attached to a goal position g and perturbed by a non-linear acceleration:

$$\dot{v}=K(g-x)-Dv+(g-x_0)f(s)$$

$$\dot{x}=v$$

where $x_0$ is the start point of a given movement, K is the spring constant, D is the damping constant, and f is a parameterized non-linear function.

In general, the controller 50 shown schematically in FIG. 1 receives a similar desired goal ($g_d$), i.e., a defined target position of a given movement of the end-effector 14, either via programming or via a specified reference path provided via demonstration learning, and executes such a set of differential equations via the DSM 52. The DSM 52 outputs a desired joint velocity ($v_d^*$) to and interacts with the HPM 53, which ultimately transmits a modified joint velocity ($v_d$) to the ICM 54. The ICM 54 in turn calculates and transmits a commanded motor torque command ($\tau_{CC}$) to the robot 12 via an impedance framework, as is well known in the art, and along with the HPM 53 receives or determines an actual joint position ($P_{14}$) and an actual velocity ($V_{14}$) from the robot 12. As is known in the art, the position may be measured via a position sensor (not shown) and the actual velocity may be calculated by the controller 50 from a series of such measured joint positions over time.

Figure 2:
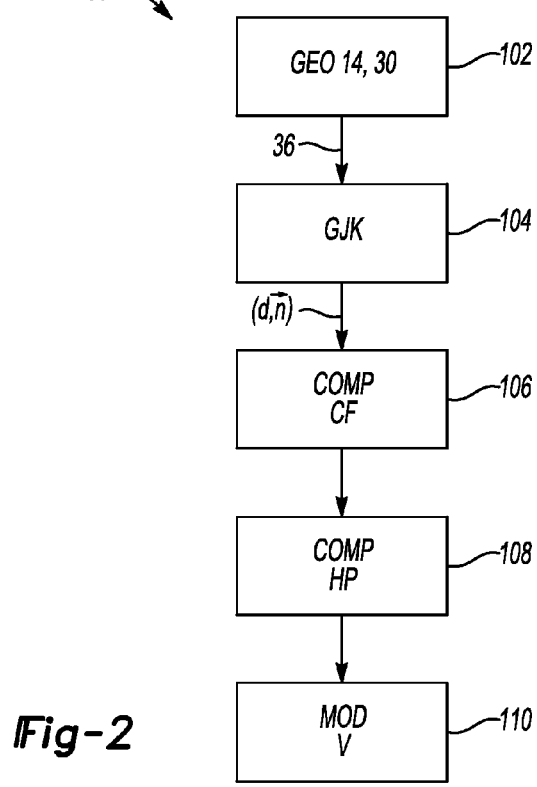
FIG. 2 is a schematic logic flow diagram describing an example harmonic potential modulator approach usable within the robotic system of FIG. 1.

FIG. 2 describes an example general embodiment of the method 100. Further details of the various steps are provided below. At step 102, the controller 50 of FIG. 1 uploads the positions and geometry (GEO) of the end-effector 14 and the dynamic obstacles 30. The dynamic obstacles 30 may be detected, as noted above, as a point cloud using the camera 15, i.e., by processing the point cloud data (arrow 19) streamed from the camera 15 to the controller 50. As part of the method 100, the controller 50 extends the concept of harmonic potential avoidance so that it can be applied to the dynamic obstacles 30, with each dynamic obstacle having an arbitrary shape.

Referring briefly to FIGS. 3A and 3B, the dynamic obstacles 30 are depicted as arbitrarily-shaped polygons. In FIG. 3A, the dynamic obstacles 30 are initially located in a flow field 34 of a constant flow, with the flow field 34 representing as vectors all the possible motion of the end-effector 14 with respect to the dynamic obstacles 30. FIG. 3B depicts streamlines 134 of a modulated version of the flow field 34 shown in FIG. 3A after execution of the method 100. The controller 50 forms an artificial boundary 36 around the dynamic obstacles 30 for avoidance of the dynamic obstacles 30 as part of the method 100 as explained below.

Referring again to FIG. 2, the output of step 102 is the shape of the boundary 36 shown in FIGS. 3A and 3B. Using the shape of the boundary 36, the controller 50 next executes the GJK algorithm at step 104 in real time while the robot 12 moves, and to compute the distance (d) and direction ($\vec{n}$) between the end-effector 14 and the dynamic obstacles 30. With S representing the shape of the boundary 36, the controller 50 determines the distance (d) and direction ($\vec{n}$) between the robot arm 16 or end-effector 14 and the obstacle 30:

$$(d,\vec{n})=GJK(S_{control},S_{obstacle})$$

In the above equation $S_{control}$ is the predefined or known shape of the end-effector 14 and/or arm 16 of FIG. 1, e.g., a polygon convex hull around the end-effector 14, and $S_{obstacle}$ is the shape of the obstacle 30. The output of GJK algorithm, particularly the distance (d), is fed into step 106.

At step 106 the controller 50 defines a contour function, $\Gamma_k(\xi_k)$, using the result of step 104. The contour function is ultimately stated as $\Gamma(d)=(m(d-\eta)+1)^\rho$. The contour function is represented as CF in step 106 of FIG. 2 for illustrative clarity. The above parameters affect the strength of any repulsive force around the obstacle 30, with m defining the scale of the distance metric, i.e., effectively regulating how quickly the contour function $\Gamma_k(\xi_k)$ increases as a function of distance (d), η represents a safety envelope which defines the distance from a given obstacle 30 at which the velocity normal to the surface of the obstacle 30 is zero, and ρ is the reactivity of the potential field around the obstacle 30, which also affects how quickly the contour function $\Gamma_k(\xi_k)$ increases with distance (d).

From this, the controller 50 of FIG. 1 next computes the harmonic potential at step 108, i.e., $$\sum_{k=1}^{N} M_k(\xi_k)\dot{\xi}_k.$$

The velocity of the end-effector 14 is then modulated via the DSM 52 using the dynamical system, with $f(t,\xi)$ being the velocity output from the dynamical system function of the DSM 52, i.e., $V_d^*$ as shown in FIG. 1.

Harmonic potentials are used by the controller 50 at step 110 to modify the control velocity $V_d^*$ derived in the vicinity of the dynamic obstacles 30 via the DSM 52. In conventional approaches, this modification is performed for a single obstacle 30 by representing the modulation as a matrix and considering the factorized form:

$$M(\xi) = E(\xi)D(\xi)E(\xi)^{-1}$$

$$\dot{\xi} = M(\xi)f(t,\xi)$$

where D is a diagonal matrix of eigenvalues of the following form:

$$D(\xi) = \begin{bmatrix} \lambda^1(\xi) & & 0 \\ & \ddots & \\ 0 & & \lambda^d(\xi) \end{bmatrix}$$

$$\lambda^i(\xi) = \begin{cases} 1 - \dfrac{1}{|\Gamma(\xi)|} & i = 1 \\ 1 + \dfrac{1}{|\Gamma(\xi)|} & 2 \le i \le d \end{cases}$$

and E is a set of basis vectors of the form:

$$E(\xi) = \begin{bmatrix} \dfrac{\partial \Gamma(\xi)}{\partial \xi_1} & -\dfrac{\partial \Gamma(\xi)}{\partial \xi_2} & \cdots & \dfrac{d\Gamma(\xi)}{\partial \xi_d} \\ \vdots & \dfrac{\partial \Gamma(\xi)}{\partial \xi_1} & & 0 \\ & & \ddots & \\ \dfrac{\partial \Gamma(\xi)}{\partial \xi_d} & 0 & & \dfrac{\partial \Gamma(\xi)}{\partial \xi_1} \end{bmatrix}$$

For the above equations, $\xi$ represents a state variable of the distance dimension d, $\Gamma$ is a scalar function that equals 1 at the contour of a shape and increases monotonically with increasing distance from the shape, $$\frac{\partial \Gamma(\xi)}{\partial \xi_i}$$

denotes the gradient of $\Gamma(\xi)$ along the $i^{th}$ dimension, and $f(t,\xi)$, once again, is the velocity output from the DSM 52, i.e., $V_d^*$. This velocity expression may be replaced by another control velocity to apply harmonic potential avoidance to other forms of control.

The above approach is then modified by the controller 50 to consider velocities of multiple dynamic obstacles 30. For multiple dynamic obstacles 30, the modulation matrix (M) noted above is evaluated via the controller 50 in the frame of reference of each dynamic obstacle 30 of FIG. 1 and then combined as a weighted product. The modification may be performed by adjusting the eigenvalues so that the global modulation matrix (M) is represented as the sum of individual components rather than as a product as in the above expressions. This approximation loses the coupling terms created by multiplying the modulation matrices of different obstacles 30 together. The coupling terms define the potential in the area between two obstacles 30 in close proximity to each other, but their contributions are small and thus can be ignored. The result of the above modification is represented mathematically as follows:

$$M_k(\xi_k) = E_k(\xi_k)D_k(\xi_k)E_k(\xi_k)^{-1}$$

$$D_k(\xi_k) = \begin{bmatrix} \lambda_k^1(\xi) & & 0 \\ & \ddots & \\ 0 & & \lambda_k^d(\xi) \end{bmatrix}$$

$$\lambda_k^i(\xi) = \begin{cases} -\dfrac{\omega_k(\xi_k)}{|\Gamma_k(\xi_k)|} & i = 1 \\ \dfrac{\omega_k(\xi_k)}{|\Gamma_k(\xi_k)|} & 2 \le i \le d \end{cases}$$

Here, the weights $\omega_k$ are defined by evaluating the contour function $\Gamma_k(\xi_k)$ for each dynamic obstacle 30:

$$\omega_k(\xi_k) = \prod_{i=1, i \ne k}^{N} \frac{\Gamma_i(\xi_i) - 1}{\Gamma k(\xi_k) - 1 + \Gamma_i(\xi_i) - 1}$$

$$\dot{\xi} = f(t, \xi) + \sum_{k=1}^{N} M_k(\xi_k)\dot{\xi}_k$$

$$\dot{\xi} = f(t, \xi) - v_k$$

This allows the controller 50 of FIG. 1 to evaluate the velocity of the dynamic obstacles 30 in each frame of reference of the dynamic obstacles 30 before combining the weighted contributions in the global frame of reference.

To make proper use of the method 100 of FIG. 2, the controller 50 defines the contour function $\Gamma_k(\xi_k)$ and its gradient for each dynamic obstacle 30. For basic shapes, the contour function and the gradient are trivial. For instance, a sphere with radius $\alpha$ would be represented as:

$$\Gamma(\xi) = \sum_{i=1}^{3} \left(\frac{\xi_i}{a}\right)^2$$

$$\frac{\partial \Gamma(\xi)}{\partial \xi_i} = 2\frac{\xi_i}{a^2}$$

The contour function in this instance increases monotonically as a function of $\xi$ and defines the contour of the circle when $\Gamma(\xi)=1$.

For more complex shapes, however, the contour function $\Gamma_k(\xi_k)$ leverages the GJK algorithm, as noted above in reference to step 104 of FIG. 2, to define the closest distance (d) and direction ($\vec{n}$) between two shapes:

$$(d, \vec{n}) = GJK(S_{control}, S_{obstacle})$$

This equation arises from the standard application of the GJK algorithm, as known in the art. The inputs are the shape representations that define the control volume and the particular dynamic obstacle 30 in question. The outputs d and $\vec{n}$ represent the respective closest distance and the direction vector between the two point clouds describing two obstacles 30. These outputs can be directly entered into the contour function and its gradient at step 106:

$$\Gamma(d)=(m(d-\eta)+1)^\rho \quad \nabla\Gamma(d)=\rho m((m(d-\eta)+1)^{\rho-1})\vec{n}$$

The contour function should not encounter distance values of less than $\eta$. At $\Gamma(d)=1$, the harmonic avoidance acts to prevent the contour function from decreasing any further. It is possible that discrete time steps may cause the control volume to penetrate this boundary, but the potential field is still viable while $\Gamma(d)>0$. At this stage the control volume is guided outward until it reaches the obstacle surface, so the contour function should never reach zero or negative values.

A benefit of the present approach is that it extends to all forms of convex shapes. The GJK algorithm applied at steps 104 and 106 requires only that a support function be defined for the type of shape that is used. The term "support function" in this case refers to the function which defines the farthest point along a given direction. For a sphere, it is simply the radius projected onto the given direction. For a point cloud, it is the furthest point along that direction. As long as these functions are provided, the present approach can extend to any shape. If a concave shape is given, usage of the support function will ensure that only the convex hull is considered.

While the best modes for carrying out the present disclosure have been described in detail, those familiar with the art to which this disclosure relates will recognize various alternative designs and embodiments within the scope of the appended claims.

The invention claimed is:

1. A robotic system comprising:
an end-effector;
an input device operable for collecting data defining a position and a velocity of a dynamic obstacle in an environment of the end-effector, wherein the dynamic obstacle has an arbitrary shape; and
a controller in communication with the end-effector, wherein the controller is programmed to receive a set of inputs via the input device, including the position and velocity of the dynamic obstacle, to compute a contour function defining the closest allowed distance and direction between the end-effector and the dynamic obstacle using the Gilbert-Johnson-Keerthi (GJK) algorithm, and to control the end-effector via an output command to thereby avoid contact between the end-effector and the dynamic obstacle;
wherein the controller is programmed with a dynamical system module (DSM) which outputs a desired control velocity command to the end-effector as a commanded motion trajectory, and the set of inputs further includes an actual position and velocity of the end-effector and a desired goal position of the end-effector, and wherein the controller further includes a harmonic potential modulator (HPM) in communication with the DSM that receives the actual velocity of the end-effector, the position and velocity of the dynamic obstacle, and the desired control velocity command as inputs, and generates a modulated desired velocity command as part of the output command.

2. The robotic system of claim 1, wherein the input device is a 3D point cloud camera and the data is 3D point cloud data.

3. The robotic system of claim 1, wherein the input device is a LIDAR camera and the data is LIDAR data.

4. The robotic system of claim 1, wherein the controller further includes an impedance control module (ICM) in communication with the HPM, wherein the ICM is programmed to receive the modulated desired velocity from the HPM and output a torque command as part of the output command to the end-effector to avoid the contact.

5. A method for avoiding contact between an end-effector of a robotic system and a dynamic obstacle in an environment, the method comprising:
collecting, via an input device, data defining a position and a velocity of a dynamic obstacle in the environment of the end-effector, wherein the dynamic obstacle has an arbitrary shape; and
receiving, via a controller, a set of inputs from the input device, including the position and a velocity of the dynamic obstacle;
computing a contour function defining the closest allowed distance and direction between the end-effector and the dynamic obstacle using the Gilbert-Johnson-Keerthi (GJK) algorithm;
using a dynamical system module (DSM) of the controller to output a desired control velocity command to the end-effector as a commanded motion trajectory, wherein the set of inputs further includes an actual position and velocity of the end-effector and a desired goal position of the end-effector, and wherein the controller further includes a harmonic potential modulator (HPM) in communication with the DSM;
receiving the actual velocity of the end-effector, the position and velocity of the dynamic obstacle, and the desired control velocity command via the HPM;
generating a modulated desired velocity command via the HPM; and
controlling the end-effector via an output command from the controller, including the modulated desired velocity command, to thereby avoid contact between the end-effector and the dynamic obstacle.

6. The method of claim 5, wherein collecting data includes collecting a 3D point cloud camera via a 3D point cloud camera.

7. The method of claim 5, wherein collecting data includes collecting LIDAR data via a LIDAR camera.

8. The method of claim 5, wherein the controller further includes an impedance control module (ICM) in communication with the HPM, the method further comprising:
receiving, via the ICM, the modulated desired velocity from the HPM; and
outputting a torque command to the end-effector via the ICM as the output command to thereby avoid the contact.

* * * * *